(12) United States Patent
Igarashi et al.

(10) Patent No.: US 7,661,633 B2
(45) Date of Patent: Feb. 16, 2010

(54) CLAMP FOR LONG COMPONENT

(75) Inventors: Koichi Igarashi, Utsunomiya (JP); Junpei Ichihashi, Saitama (JP)

(73) Assignee: Newfrey LLC, Newark, DE (US)

( * ) Notice: Subject to any disclaimer, the term of this patent is extended or adjusted under 35 U.S.C. 154(b) by 198 days.

(21) Appl. No.: 11/295,552

(22) Filed: Dec. 7, 2005

(65) Prior Publication Data

US 2006/0130286 A1    Jun. 22, 2006

(30) Foreign Application Priority Data

Dec. 16, 2004   (JP) .............................. 2004-364371

(51) Int. Cl.
*F16B 15/00* (2006.01)

(52) U.S. Cl. .......................... 248/74.3; 248/62; 248/69; 248/71

(58) Field of Classification Search ................... 248/63, 248/62, 69, 71, 74.3, 74.2
See application file for complete search history.

(56) References Cited

U.S. PATENT DOCUMENTS

| | | | | |
|---|---|---|---|---|
| 4,135,749 A | * | 1/1979 | Caveney et al. | 24/16 PB |
| 4,688,302 A | * | 8/1987 | Caveney et al. | 24/16 PB |
| 4,754,529 A | * | 7/1988 | Paradis | 24/16 PB |
| 4,805,856 A | * | 2/1989 | Nicoli et al. | 248/74.3 |
| 5,131,613 A | * | 7/1992 | Kamiya et al. | 248/74.3 |
| 5,601,261 A | * | 2/1997 | Koike | 248/71 |
| 6,149,109 A | * | 11/2000 | Stankowski | 248/74.3 |
| 6,749,157 B2 | * | 6/2004 | Takeuchi | 248/71 |

FOREIGN PATENT DOCUMENTS

| | | |
|---|---|---|
| EP | 0 559 340 A | 2/1993 |
| JP | 7-212943 | 8/1995 |
| JP | 8-93723 | 4/1996 |
| JP | 2003-028111 | 1/2003 |
| JP | 2003-028111 A | 1/2003 |

\* cited by examiner

*Primary Examiner*—J. Allen Shriver, II
*Assistant Examiner*—Steven M Marsh
(74) *Attorney, Agent, or Firm*—Michael P. Leary; Stephen R. Valancius (57) ABSTRACT

A clamp 1 comprises a band 3, a buckle 5 having a support surface 18 against which a long component wound by the band is held, and a clip 6 extending from the buckle 5 and secured to, e.g., a body panel. The buckle 5 comprises a pawl 15 for engaging ratchet teeth 17 on the band, a first guide 25 and a second guide 26 forming an insertion passage 19 for guiding the band 3 and restraining the band 3 inside the insertion passage 19. The second guide 26 is formed in a shape by which the rear portion 30 of the insertion passage 19 including the outlet is parallel to the support surface 18, and the first guide 25 is formed in a shape by which the front portion 31 of the insertion passage 19 including the inlet is connected to the rear portion 30 at an acute angle of inclination 29 with respect to the rear portion 30.

17 Claims, 9 Drawing Sheets

CLAMP FOR LONG COMPONENT

CROSS-REFERENCE TO RELATED APPLICATION

This application claims the benefit of Japanese Patent Application No. 2004-364371 filed Dec. 16, 2004, incorporated herein by reference.

BACKGROUND OF THE INVENTION

The present invention relates to a clamp for mounting a long component, such as a wire harness or electrical wiring, on a support such as the body panel of an automobile.

Clamps using a band for mounting long components such as wire harnesses or electrical wiring, on body panels are well known in the art. The clamped long component should not make contact with other components if its position shifts with respect to a support surface of a buckle of the clamp. When the long component has a diameter greater than the width of the support surface of the buckle, the long component can be kept from slipping into a band inlet of the buckle by winding it up in the band. However, this causes interference with other components surrounding the clamped component. Also, if the clamped component slips to a position at which it is blocked by a large diameter wire hardness, for example, the clamped component cannot be seen. This makes it difficult to insert the end of a mounting device of the clamp into a mounting hole in the support. There is currently no known clamp for a long component in which shifting of the position of a clamped long component on the support surface of the buckle, due to the size of the outer diameter of the long component, is prevented reliably.

In Japanese Unexamined Patent Application [Kokai] Publication No. 7-212943 (Patent Document 1), a clamp for a long component comprises a band wound around and securing the outer circumferential surface of a long component, such as a wire harness or electrical wiring, a buckle having a support surface near a base of the band for placement of the long component wound with the band against the support surface and for holding the band in a wound state, and a mounting device connected to the buckle and extending opposite to the long component on the support surface of the buckle for mounting the clamp on a support such as a body panel. In order to keep the center line of the mounting device from slipping with respect to the center line of the clamped component, an alignment groove is formed in the support surface of the buckle to match the center line of the mounting device to the center line of the clamped component. Even when a large diameter wire harness is used, which often causes slippage, the center line of the mounting device remains aligned with the wire harness, and the wire harness is kept from slipping out of position when mounted.

A clamp for a long component is disclosed in Japanese Unexamined Patent Application [Kokai] Publication No. 8-093723 (Patent Document 2) that reduces the amount of slippage of a long component with respect to a buckle, irrespective of the outer diameter of the long component. In this clamp, a band insertion passage extends from a support surface of the buckle along the axis of the mounting device, i.e., in the axial direction of the mounting device. Because of this, the center line of the long component wound with the band and held by the support surface remains fairly constant regardless of the outer diameter of the long component.

In Japanese Unexamined Patent Application [Kokai] Publication No. 2003-028111 (Patent Document 3), a clamp for a wire harness has a buckle that comprises an insertion passage for guiding a band so that an engagement portion on the band is engaged by a pawl or the buckle, and guide portions for restraining the band in the insertion passage. The insertion passage extends from an inlet for the band opposite to the base of the band to an outlet for the band near the base of the band. This clamp has elements to press a wire harness against a support surface. As a result, the center line of the wiring harness remains aligned with the axis of the mounting device whether the diameter of the wire harness is large or small.

When a wire harness is placed inside the groove in the support surface of the buckle in the clamp described in Patent Document 1, it is kept from becoming misaligned. However, because an insertion passage is not properly formed in the buckle so as to restrain the band, both the band and the wire harness may separate from the support surface in the buckle, and the position of the wire harness may not be secure. Because the band in the clamp described in Patent Document 2 is pulled out of an insertion passage in the buckle in the axial direction of the mounting device, the band pull out operation requires a hand to be inserted between the buckle and a surface of the opposing support. As a result, the operability of the clamp is impaired. In the clamp described in Patent Document 3, an insertion passage is formed in the buckle to restrain the band, so that the wire harness does not come off the support surface of the buckle. The band can be pulled out of the insertion passage from the buckle side. However, the clamp described in Patent Document 3 needs a special protrusion on the support surface of the buckle.

BRIEF DESCRIPTION OF THE INVENTION

The present invention provides a clamp for a long component that restrains the band in the insertion passage of the buckle, allows the band to be pulled out of the insertion passage from the buckle side, does not require a support surface in the buckle with a particular shape, and allows the center line of a long component such as a wire harness to be aligned with the axis of the mounting device.

Broadly stated, the present invention is a clamp for a long component, such as a wire harness or electrical wiring, comprising a band that is wound around the outer circumferential surface of the long component, a buckle having a support surface near a base of the band for placement thereon of the long component wound with the band and that holds the band in a wound state, and a mounting device extending from the buckle opposite to the long component on the support surface of the buckle, for mounting the clamp on a support such as a body panel. More particularly, in one embodiment the band has engagement portions formed at a certain interval lengthwise, and the buckle has a pawl for engaging engagement portions to maintain the band in a wound state. The buckle has an insertion passage for guiding the band so engagement portions are engaged by the pawl, and guide portions for restraining the band in the insertion passage. The insertion passage extends from an inlet for the band opposite to the base of the band to an outlet for the band near the base of the band. A guide portion is formed in a shape by which a rear portion (about half) of the insertion passage including the outlet is substantially parallel to the support surface. Another guide portion is formed in a shape by which a front portion (about half) of the insertion passage including the inlet is connected to the rear portion at an acute angle of inclination with respect to the rear portion.

This clamp for a long component is thus able to restrain the band in the insertion passage of the buckle, and to allow the band to be pulled out from the insertion passage at a buckle side, and does not require a support surface in the buckle with a particular shape. Because a guide portion is formed in a shape by which the rear portion of the insertion passage including the outlet is substantially parallel to the support surface, and another guide portion is formed in a shape by which the front portion of the insertion passage including the inlet is connected to the rear portion at an acute angle of inclination with respect to the rear portion, the long component is kept from slipping into the inlet when the band is wound about the long component, the long component is kept from shifting out of position on the buckle regardless of the diameter of the long component, and the center line of the long component is kept aligned with the axis of the mounting device.

In this clamp, a pawl is positioned on the center line widthwise with respect to the insertion passage, the guide portions include a first guide positioned on the center line of the front portion of the insertion passage widthwise with respect to the insertion passage and extending to the pawl, and a second guide with parts positioned on side edges of the insertion passage so as not to obstruct the engagement of the pawl with engagement portions of the band, and formed apart from the first guide heightwise so as to define the height of the insertion passage. The first guide and the second guide form the front portion of the insertion passage including the inlet.

Also, the pawl and the first guide form an insertion passage surface apart from the support surface, and the second guide forms an insertion passage surface near the support surface. Alternatively, the pawl and the first guide form an insertion passage surface near the support surface, and the second guide forms an insertion passage surface apart from the support surface. In addition, the pawl forms a surface of the rear portion of the insertion passage, and an engagement release tab is formed on an end of the pawl extending to the outside from the outlet. Furthermore, the mounting device has a shank extending from the buckle and anchor legs bent back from the end of the shank towards the buckle for engaging a mounting hole in a support, and the boundary between the front portion and the rear portion of the insertion passage extends along the axis of the shank.

BRIEF DESCRIPTION OF THE DRAWINGS

The invention will be further described in conjunction with the accompanying drawings, which illustrate preferred (best mode) embodiments of the invention, and wherein.

DETAILED DESCRIPTION OF THE INVENTION

Figure 5:
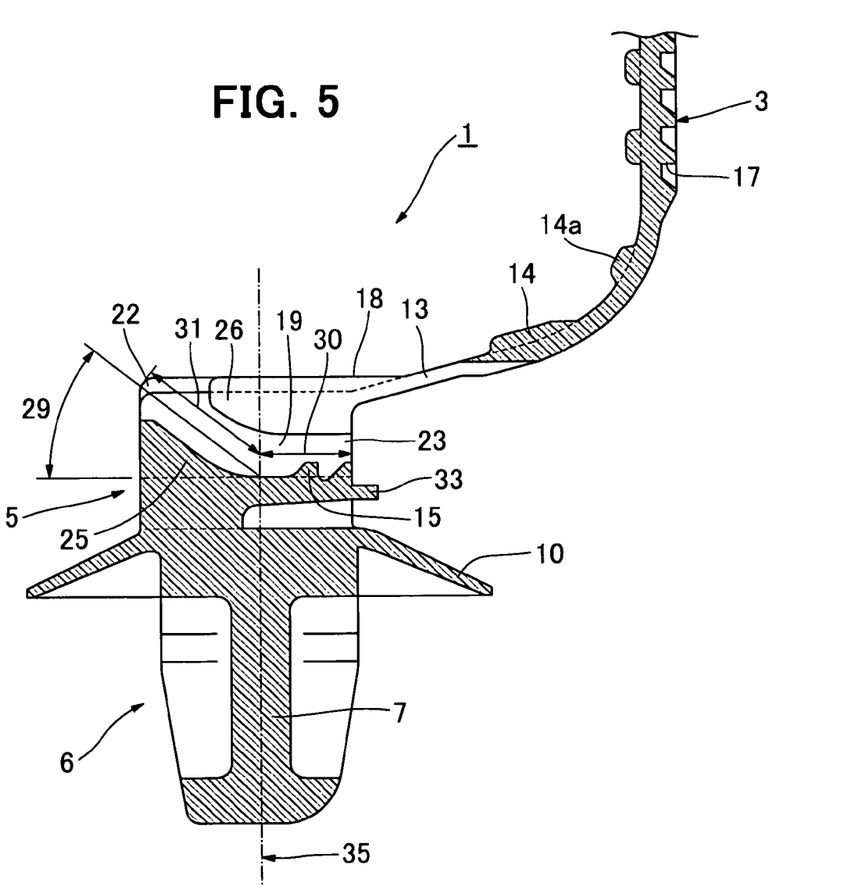
FIG. 5 is a cross-sectional view of the clamp along line V-V in FIG. 2.
Figure 6:
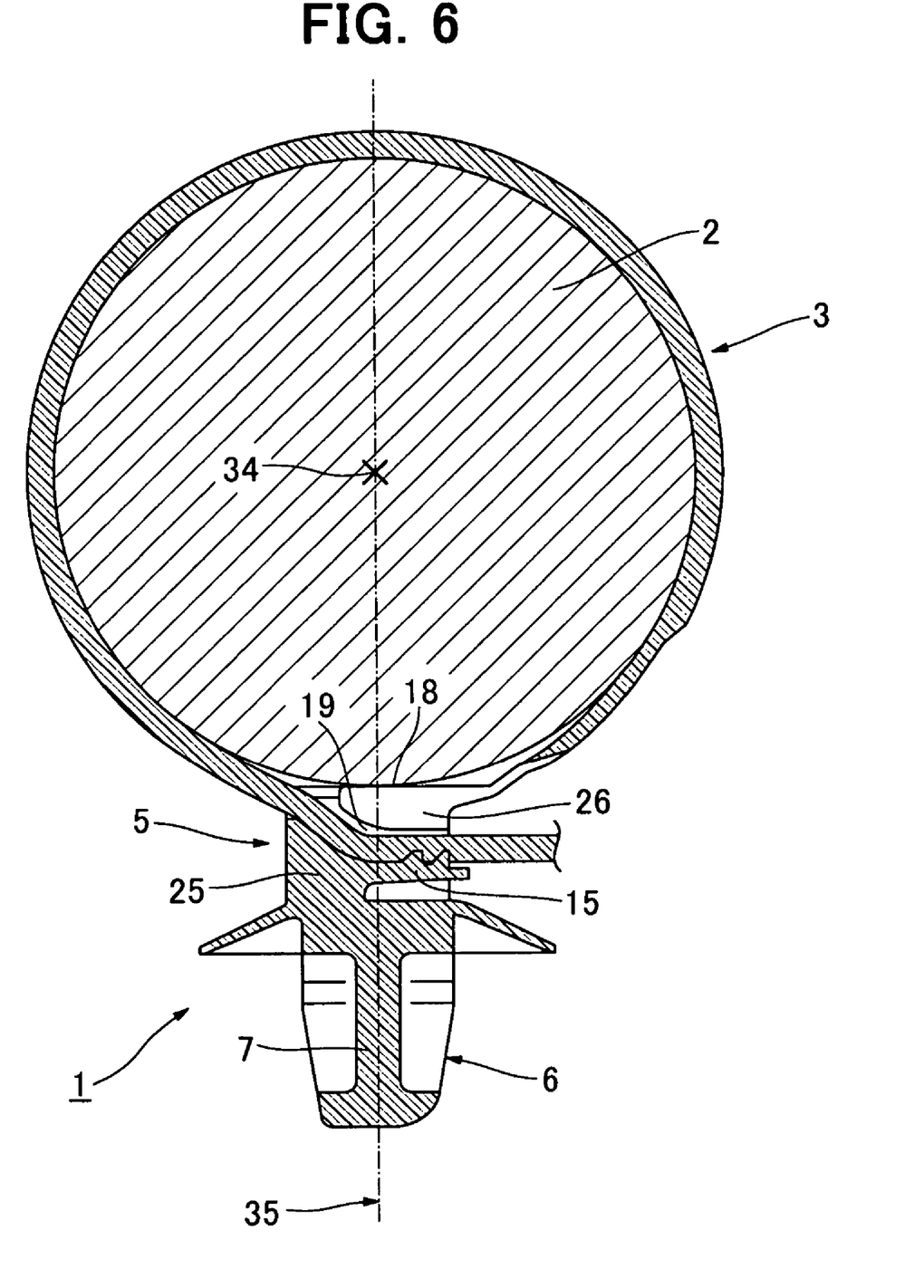
FIG. 6 is a cross-sectional view of a long component being held by the clamp in FIG. 1.

The following is an explanation of embodiments of the present invention with reference to the drawings. FIG. 1 through FIG. 5 show a clamp 1 for a long component in the first embodiment of the present invention, where the long component is a wire harness or electrical wiring, for example. FIG. 6 shows a long component 2 with a round cross-section, such as a wire harness or electrical wiring, being held by the clamp 1 shown in FIG. 1 through FIG. 5. The clamp 1, which is preferably an integrally molded component made of hard plastic, comprises a slender band 3, a buckle 5 having a support surface 18 formed near a base of the band 3 for placement thereon of a long component 2 (see FIG. 6) wound with the band 3 and that holds the band 3 in a wound state, and a mounting device in the form of an anchor-shaped clip 6 extending from the buckle 5 opposite to the long component 2 on the support surface 18 of the buckle 5, for mounting the clamp on a support such as a body panel. For convenience of description the support will be referred to simply as a panel.

Figure 1:
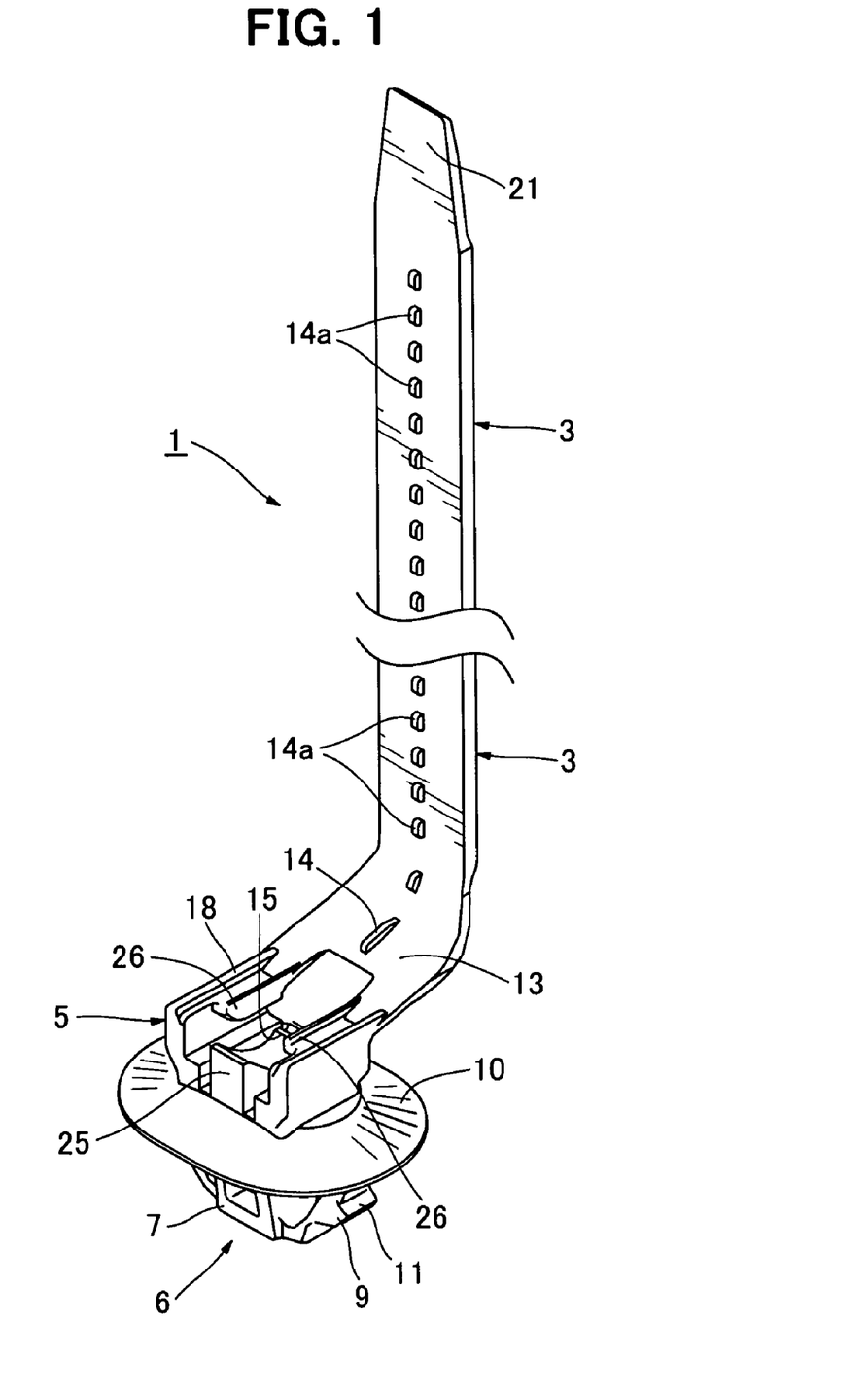
FIG. 1 is a perspective view of a clamp for a long component in a first embodiment of the present invention, with some of the band cut away.
Figure 2:
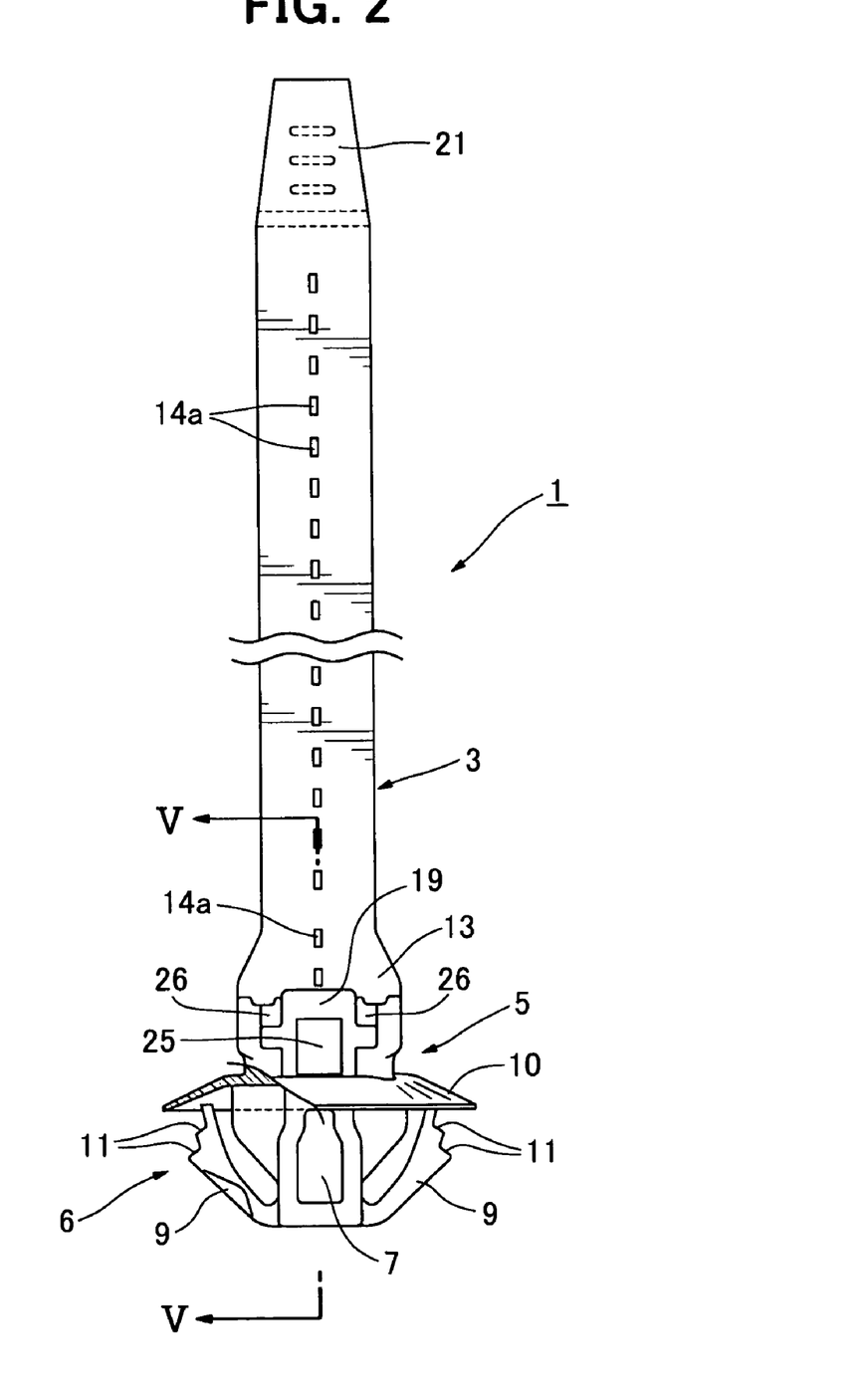
FIG. 2 is a left side view of the clamp in FIG. 1.
Figure 3:
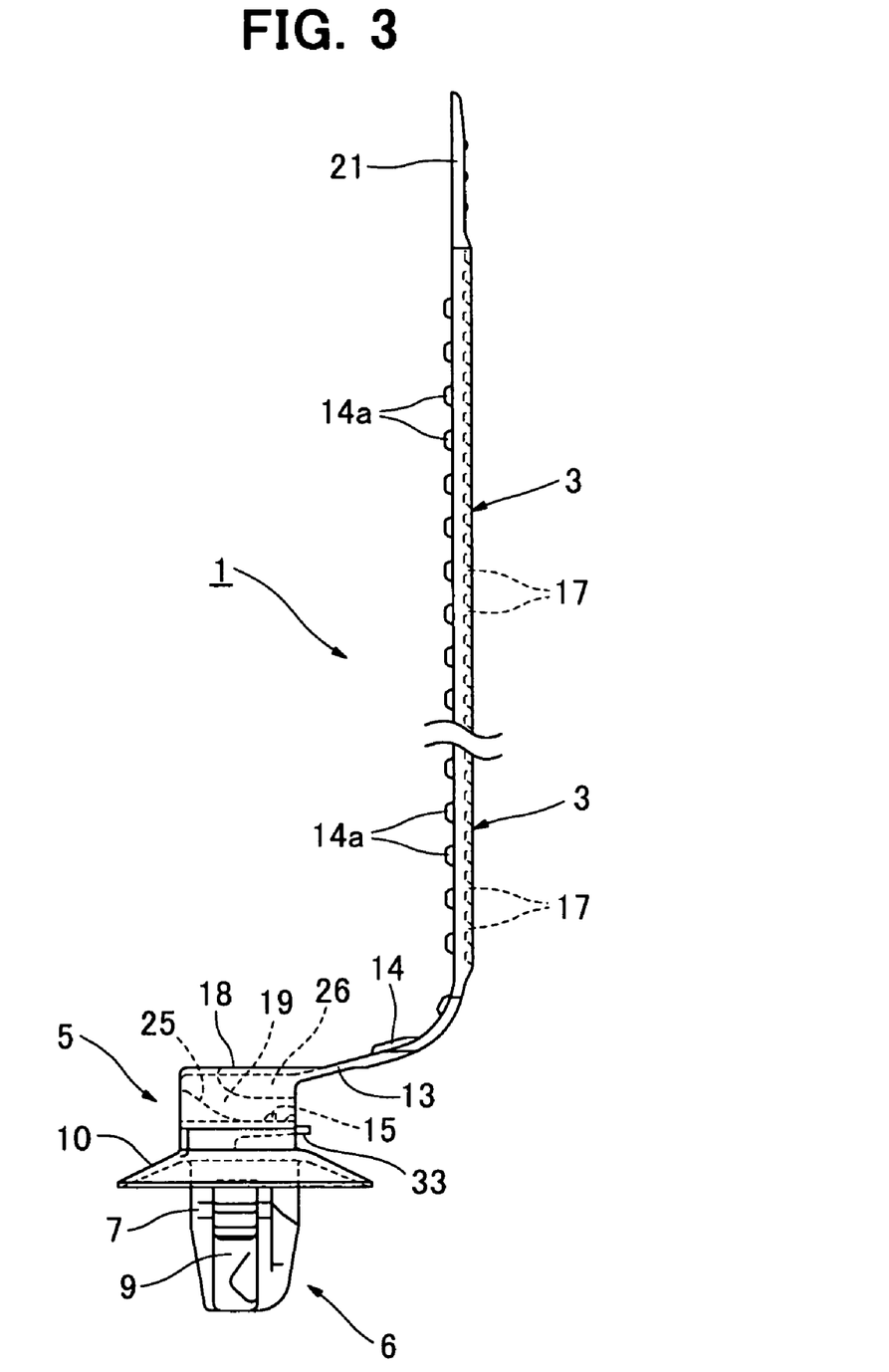
FIG. 3 is a front view of the clamp in FIG. 1.
Figure 4:
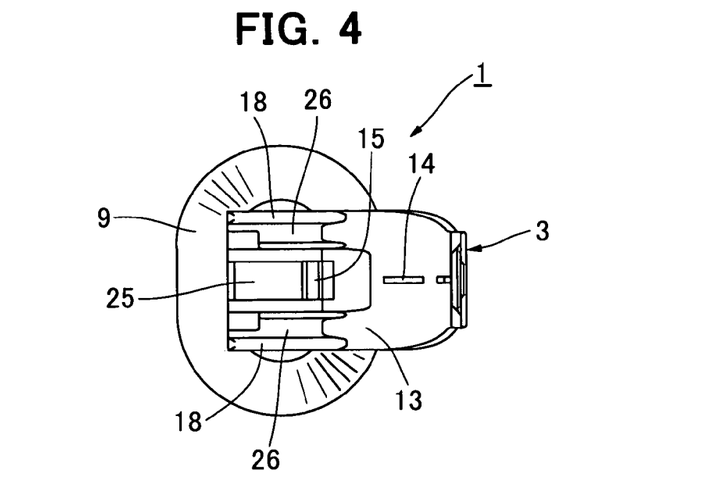
FIG. 4 is a plan view of the clamp in FIG. 1.

The anchor-shaped clip 6 has a shank 7 extending downward from the buckle 5, a pair of legs 9 extending on an incline from the bottom end of the shank 7 towards the buckle 5 so as to flare outward, and a flange 10 above the shank 7 and legs 9 but below the buckle 5. The legs 9 are flexible and bend elastically on the sides of the shank 7. A plurality of shoulders 11 are formed on the upper end of the legs 9 so as to be able to accommodate panels of varying thicknesses. By inserting the shank 7 and the legs 9 into a mounting hole in a panel, the edge of the mounting hole can be engaged by one of the shoulders 11 on the legs 9 depending on the thickness of the panel, so that the flange 10 is flush with an upper surface of the panel. In this way, the clamp 1 is mounted on the panel. The flange 10 is preferably suction cup-shaped so as to seal the mounting hole when the clip 6 is mounted and so as to increase the securing force after mounting.

In the example described, the mounting device used to mount the long component on a panel is an anchor-shaped clip 6. However, the present invention is not restricted to such a mounting device. For example, the mounting device can be formed so that it extends straight down from the buckle 5. Another example of a mounting device is a stud engagement component extending downward from the buckle 5 which engages a rod-shaped stud (threaded stud or stud with circumferential grooves) extending from a panel.

The slender band 3 extends outwards from its base 13 at one side of the buckle 5 far enough to be able to wind around and secure long components of varying diameters, such as wire harnesses and electrical wiring. The base 13 of the band 3 is preferably wider and thinner than the rest of the band (and may be bifurcated), and is thus more flexible than the rest of the band, so that the band can be wound about long components with small diameters. One or more ribs 14 extend lengthwise on the base 13 to make contact with a long component. The ribs make the base 13 stronger and keep a wound long component from moving lengthwise. A plurality of protrusions 14a are formed at a certain interval on the band 3 from the ribs 14 towards the tip of the band. The protrusions also keep a wound long component from moving lengthwise.

A plurality of ratchet teeth 17 (see FIGS. 3 and 5) on the band at a certain interval (pitch) along the length of the band 3 form engagement portions for engaging spaced tapered protrusions of a pawl 15 in the buckle 5 in order to secure the band 3 in a wound state. In the clamp 1 of the first embodiment, the pawl 15 is positioned on a surface of an insertion passage 19 at a side of the insertion passage apart from the support surface 18 of the buckle 5. The ratchet teeth 17 are formed on a side of the band opposite to the side with the protrusions 14*a*, so that they face the pawl 15 after the band 3 has passed through the insertion passage 19 (to be explained below) in the buckle 5. A tapered leader 21 is formed on the free end of the band 3 so that the band can be passed easily into the insertion passage 19 in the buckle 5 and so that the band 3 can be easily pulled out from the insertion passage.

The buckle 5 has a guide portion forming the insertion passage 19 that guides the band 3 so that ratchet teeth 17 engage the pawl 15, and that restricts the band 3. The insertion passage 19 extends from an inlet 22 opposite to the base 13 of the band 3 to an outlet 23 near the base 13 of the band. The guide portion forming the insertion passage 19 includes of a first guide 25 and a second guide 26. The first guide 25 is positioned in the center of the insertion passage 19 widthwise and extends along the insertion passage 19 lengthwise, forming, with pawl 15, a bottom surface of the insertion passage 19. The second guide 26 has parts extending along the insertion passage 19 lengthwise and forming opposite side wall edges of the insertion passage as well as top wall portions adjacent to the side walls.

The guide portion is formed so that a rear portion 30 (see FIG. 5) of the insertion passage 19 including the outlet 23 is substantially parallel to the support surface 18, and the front portion 31 (FIG. 5) of the insertion passage 19 including the inlet 22 is connected to the rear portion at an acute angle of inclination (e.g., about 35°) with respect to the rear portion 30 of the insertion passage. More specifically, the first guide 25 is in the center of the insertion passage 19 widthwise so that the band 3 inserted into the front portion 31 of the insertion passage travels at an acute angle of inclination with respect to the rear portion 30 of the insertion passage. The term "angle of inclination" used in this specification is denoted by acute angle 29 shown in FIG. 5. The angle of inclination 29 is set to keep the long component from slipping with respect to the buckle and into the inlet 22 when a long component 2 is wound with the band 3 and pressed up against the support surface 18 of the buckle 5. This angle also keeps the center line of a long component with a round cross-section, such as a wire harness, aligned with the axis of the mounting device regardless of the diameter of the long component. A portion of the inlet 22 formed by the second guide 26 is also shaped to maintain the angle of inclination. The surfaces of the guides that define the front portion of the insertion passage 19 may have a slight curvature, as shown in FIG. 5, for example, to facilitate a smooth junction of the front portion and the rear portion of the insertion passage.

Pawl 15 is an elastic support arm extending from the first guide 25, and forms a bottom surface of the rear portion 30 of the insertion passage so that the rear portion 30 of the insertion passage extends substantially parallel to the support surface 18. The tip of the pawl 15 extends outward from the outlet 23 of the insertion passage 19 to form an engagement release tab 33. When the tip of a tool (e.g., screw driver) presses on the engagement release tab 33, engagement of pawl 15 and ratchet teeth 17 is released. If the engagement release tab 33 is extended sufficiently, the release operation can be performed using a finger.

Sections of the second guide 26 form side wall edges of the insertion passage 19 as well as upper wall edges. The insertion passage 19 is nearly open at the top, so that the engagement of the pawl 15 with the ratchet teeth 17 of the band 3 is not obstructed. The height of the insertion passage 19 from the surface of the first guide 25 and the surface of the pawl 15 is defined by the second guide 26. As in the case of the first guide 25, the second guide 26 has a curved front portion surface that maintains a certain angle of inclination near the inlet 22, so that the band 3 can be inserted smoothly.

In the front portion 31 of the insertion passage 19, the first guide 25 and the second guide 26 are inclined at the angle of inclination 29, but the rear portion 30 is substantially parallel to the support surface 18, at the pawl 15 and the second guide 26. Because the portion of the band inserted into the insertion passage 19 is restrained inside the insertion passage 19, the long component 2 wound and secured by the band 3 is held securely against the support surface 18. In this clamp 1, the boundary between the front portion 31 and the rear portion 30 of the insertion passage extends along the axis of the shank 7 of the clip 6.

The support surface 18 for placement thereon of the long component 2 wound with the band 3 is formed in the upper portion of the buckle 5. In this clamp 1, the support surface 18 is formed with the upper portion of the second guide 26. The support surface 18 can have any appropriate shape as long as placement thereon of the long component 2 wound with the band 3 is possible.

FIG. 6 shows a long component 2 with a round cross-section, such as a wire harness or electrical wiring, attached to the clamp 1. The band 3 is passed through the insertion passage 19 in the buckle 5, and the pawl 15 engages ratchet teeth 17 of the band 3 to secure it in a wound state. Because the band 3 is restrained inside the insertion passage 19 of the buckle 5 as described earlier, the long component 2 is pressed against the support surface 18 of the buckle 5. After inserting the band 3 into the front portion 31 of the insertion passage 19 at the angle of inclination 29, it is pulled out substantially parallel to the pawl 15. Because the band 3 is inserted at the angle of inclination 29 on the inlet side, the long component is kept from slipping into the inlet 22 when the long component 2 is pressed against the support surface 18 of the buckle 5. As a result, a long component, such as a wire harness or electrical wiring, does not slip out of position on the buckle 5 regardless of the outer diameter of the long component 2. By aligning the center line of a round cross-section long component, such as electrical wiring or a wire harness, with the center line of the support surface 18 of the buckle 5, and by aligning the center line of the clip 6 (mounting device) with the center line of the support surface 18, the center line 34 of the long component 2 can be aligned with the axis 35 of the shank 7 of the clip 6, so that the axis 35 substantially intersects the center line 34. The axis 35 is substantially perpendicular to the support surface 18 (and 18A later described). By disposing the boundary between the front portion 31 and the rear portion 30 of the insertion passage along the axis of the shank 7 of the clip 6, the center line of the long component is easily aligned with the axis of the mounting device.

Because the position of a long component 2, such as electrical wiring or a wire harness, is kept from slipping on the buckle 5 regardless of the outer diameter of the long component 2, the long component 2 does not interfere with other components. Also, even though the clip 6 cannot be seen by a worker if the long component 2 has a large diameter, the center line of the long component 2 can be treated as the axis of the shank 7 on the clip 6 to easily mount the clip 6 in a mounting hole.

FIG. 7 through FIG. 11 show a clamp 37 for a long component in a second embodiment of the present invention. Clamp 37 is similar to the clamp 1 in the first embodiment in that the band 3A, buckle 5A and mounting clip 6A are integral components made of hard plastic. A difference is that in the first embodiment the buckle pawl 15 and the first guide 25 form an insertion passage surface apart from the support surface 18 and the second guide 26 forms an insertion passage surface near the support surface 18 in clamp 1, while in the second embodiment a pawl 38 and a first guide 39 form an insertion passage surface near from the support surface 18A and a second guide 41 forms an insertion passage surface apart from the support surface 18A. Because of this difference, in clamp 37 ratchet teeth 42 on the slender band 3A are formed on the side facing the long component when the long component is wound up, and ribs 43 are formed on the longitudinal edges of the band 3A, instead of the protrusions 14a in clamp 1. The shapes of the first guide 39 and the second guide 41 in clamp 37 also differ from the shapes of the first guide 25 and the second guide 26 in clamp 1. Another difference is that the mounting device clip 6A in clamp 37 is shaped somewhat differently from the clip 6 in clamp 1.

The following is an explanation of the clamp 37 for a long component in the second embodiment with reference to FIG. 7 through FIG. 11. An explanation of the configurational elements identical to those in the clamp 1 of the first embodiment has been omitted. For an explanation of these components, please see the explanation of the same components in the clamp 1 of the first embodiment.

Figure 7:
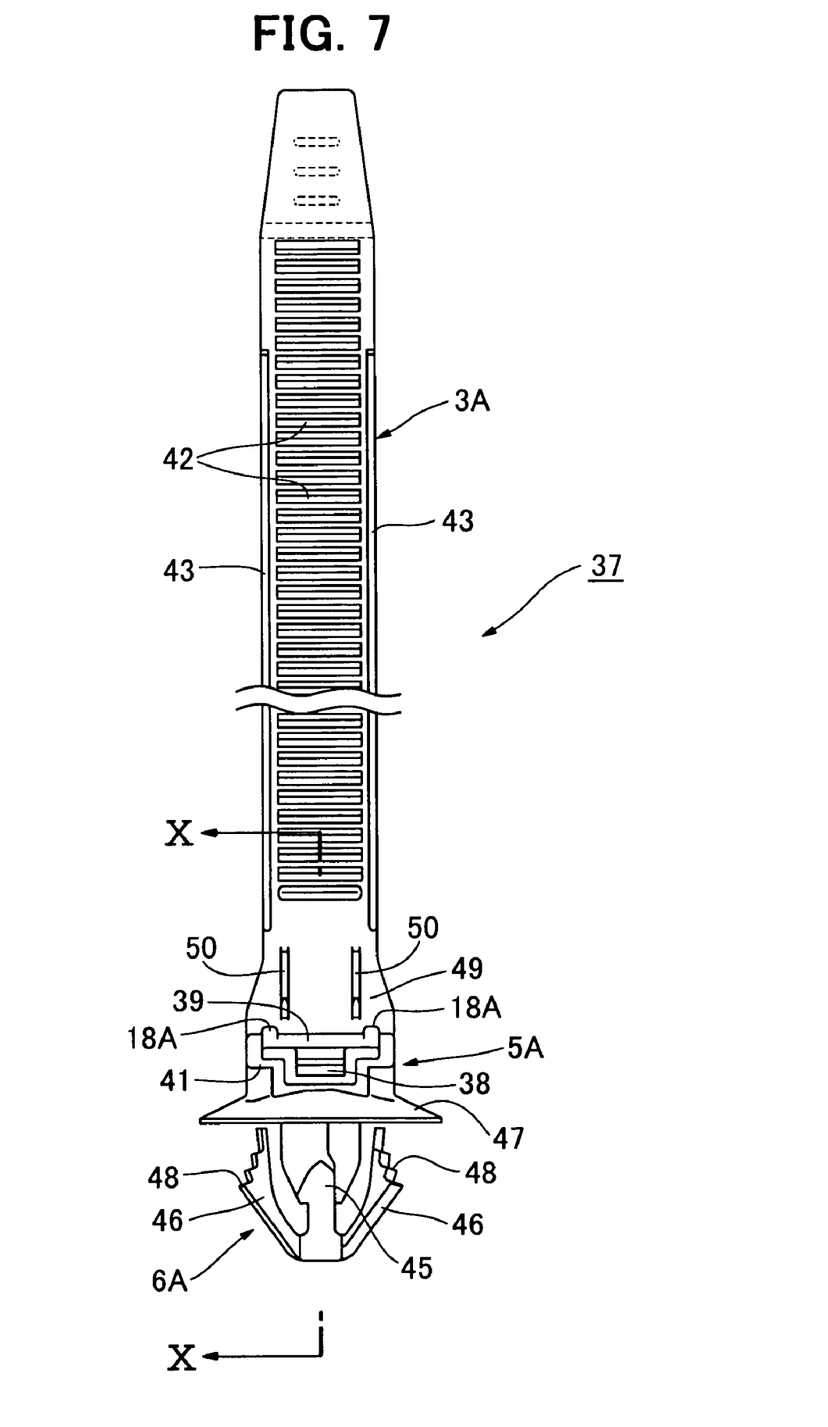
FIG. 7 is a side view of a clamp for a long component in a second embodiment of the present invention, with some of the band cut away.
Figure 8:
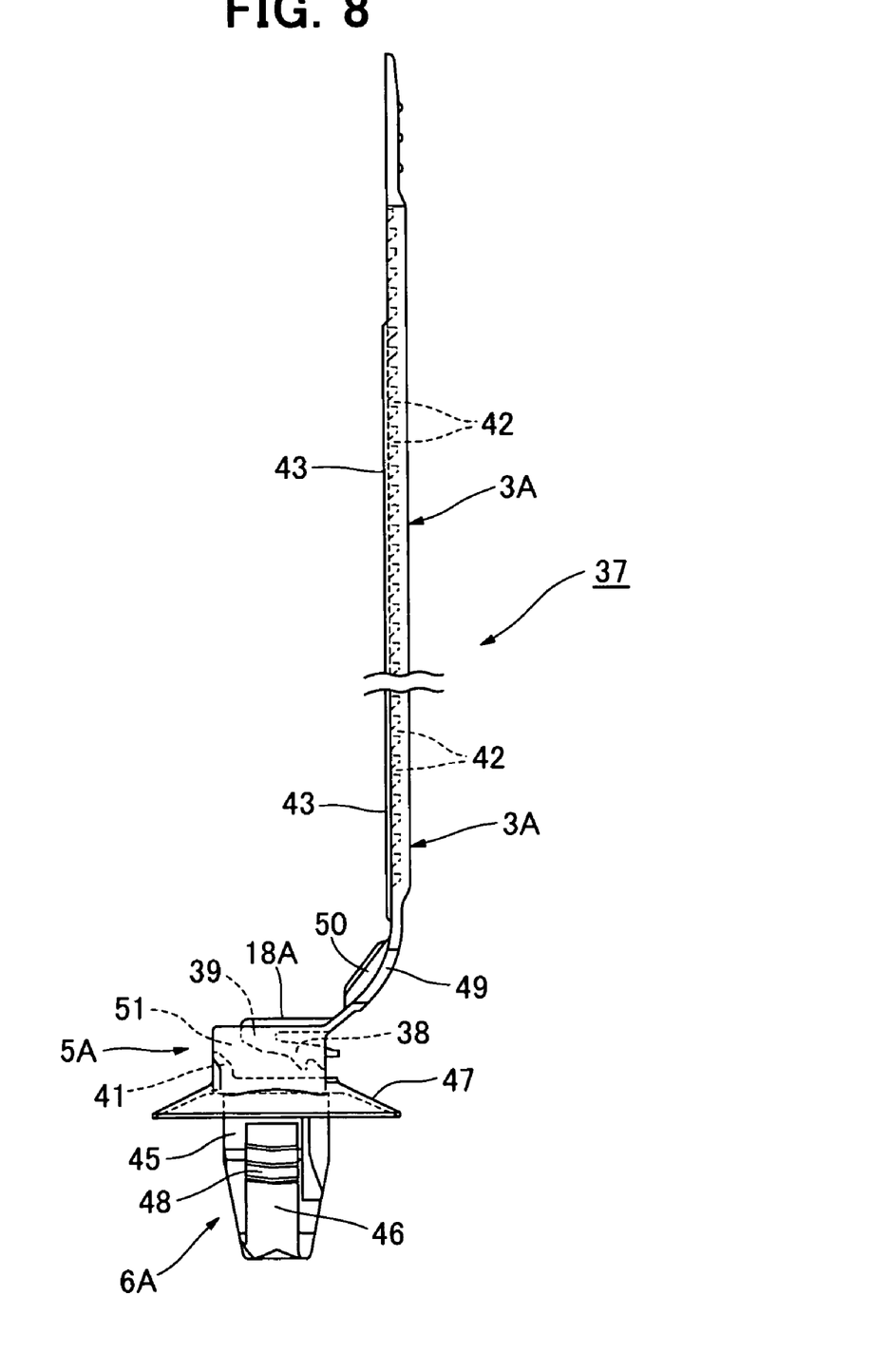
FIG. 8 is a front view of the clamp in FIG. 7.
Figure 9:
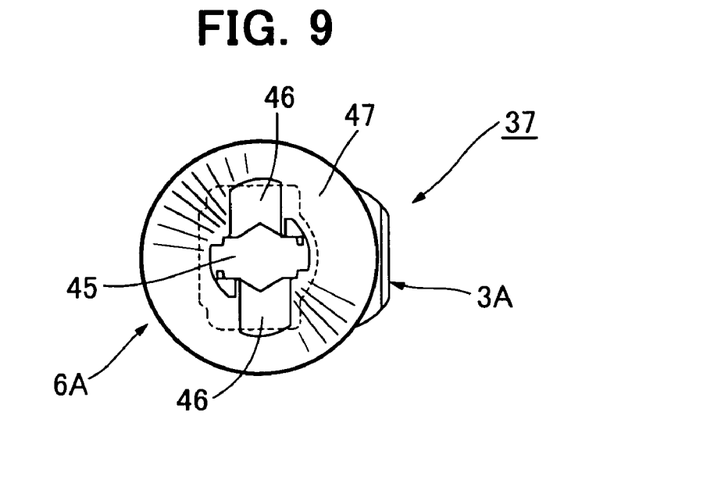
FIG. 9 is a bottom view of the clamp in FIG. 7.
Figure 10:
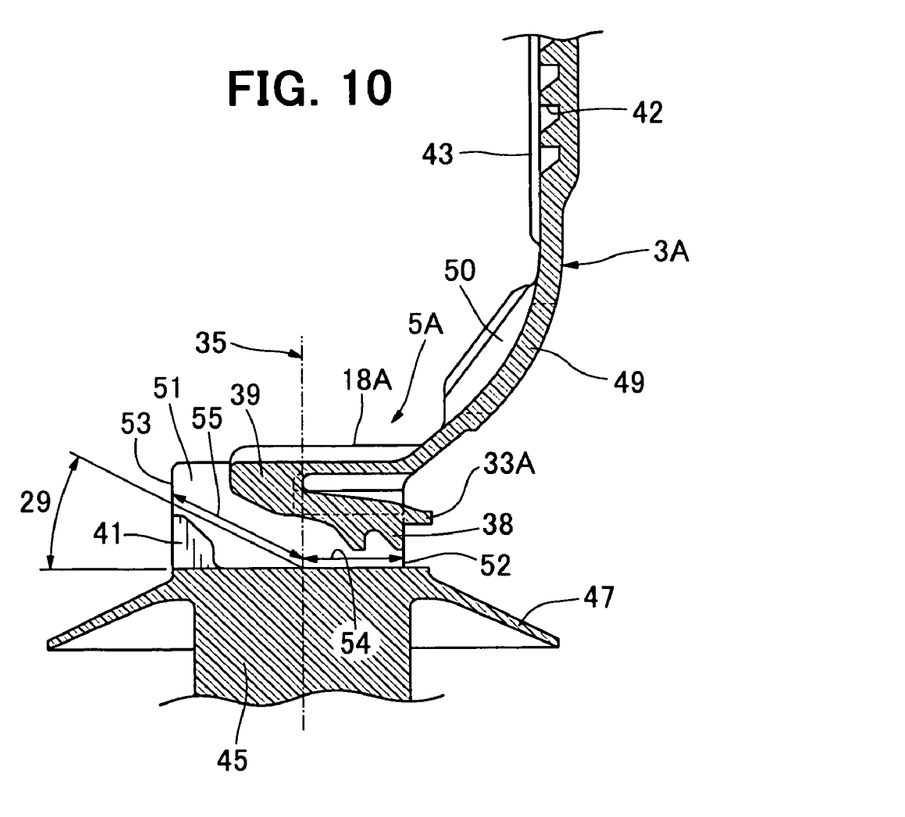
FIG. 10 is a partial cross-sectional view of the clamp along line X-X in FIG. 7.

The anchor-shaped clip 6A in clamp 37 has a shank 45 extending downward from the buckle 5A, a pair of legs 46 extending from the bottom end of the shank 45 toward the buckle 5A on an incline so as to flare outward, and a flange 47 above the shank 45 and the legs 46 but below the buckle 5A. A plurality of shoulders 48 are formed on the upper end of the legs 46 corresponding to different thicknesses of a panel on which clamp 37 is to be mounted.

The slender band 3A in clamp 37 extends outward from its base 49 at one side of the buckle 5A far enough to be able to wind around and secure long components of varying diameters, such as wire harnesses and electrical wiring. The base 49 of the band 3A is preferably wider and thinner than the rest of the band. A pair of ribs 50 extend lengthwise on the base 49 to make the base 49 stronger and keep the wound long component from moving lengthwise. As described earlier, ribs 43 are formed on opposite edges of the band 3A to keep the wound long component from moving lengthwise. A plurality of ratchet teeth 42 are formed at a certain interval (pitch) along the length of the band 3A to form engagement portions for engaging the pawl 38 on the buckle 5A in order to secure the band 3A in a wound state. In the clamp 37 of the second embodiment, the pawl 38 is positioned on a surface of the insertion passage near the support surface 18A of the buckle 5A. Accordingly, the ratchet teeth 42 are formed on the surface of the band 3A flush with the wound long component.

The buckle 5A has a guide portion comprising a first guide 39 and a second guide 41, and an insertion passage 51 that guides the band 3A so that the ratchet teeth 42 engage the pawl 38, and restricts the band 3A inside. The first guide 39 is positioned in the center of the insertion passage 51 widthwise and extends along the insertion passage 51 lengthwise forming top surface of the insertion passage 51. The second guide 41 extends along the insertion passage 51 lengthwise and forms both the side walls of the insertion passage 51 as well as a bottom surface adjacent to the side walls. The guide portion is formed so that the rear portion 54 (see FIG. 10) of the insertion passage 51 including the outlet 52 is substantially parallel to the support surface 18A, and the front portion 55 (FIG. 10) of the insertion passage 51 including the inlet 53 is connected to the rear portion at an acute angle of inclination 29 with respect to the rear portion 54 of the insertion passage. The angle of inclination 29 is set to keep the long component from slipping into the inlet 53 when the long component is wound with the band 3A and pressed against the support surface 18A of the buckle 5A. This prevents slippage with respect to the buckle and keeps the center line of a long component with a round cross-section, such as a wire harness, aligned with the axis of the mounting device regardless of the diameter of the long component.

The first guide 39 forms a top surface of the front portion 55 of the insertion passage, and is shaped so as to create a specific angle of inclination 29 that allows smooth insertion of the belt 3A. The pawl 38 is an elastic support arm extending from the first guide 39 substantially parallel to the support surface 18A and forms an upper surface of the rear portion 54 of the insertion passage. The tip of the pawl 38 has an engagement release tab 33A. In clamp 37, the support surface 18A of the buckle 5A is formed in an upper surface of the first guide 39.

The second guide 41 has side walls extending along the entire length of the insertion passage 51 to define both side edges and a bottom surface extending along the entire length of the insertion passage 51 that is flush with the upper surface of the flange 47. The second guide 41 is formed with an inclined surface in the portion near the inlet 53 to the insertion passage to maintain the angle of inclination 29 and allow smooth insertion of the band 3A. In this clamp 37, the front portion 55 of the insertion passage 51 is formed by the first guide 39 and the second guide 41 on an incline at the angle of inclination 29, and the rear portion 54 is formed by the pawl 38 and the second guide 41 so as to be substantially parallel to the support surface 18A. Because the insertion passage 51 restrains a portion of the belt inside the insertion passage 51, the long component wound with the band 3A is held against the support surface 18A. In this clamp 37, the boundary between the front portion 55 and the rear portion 54 of the insertion passage extends along the center line 35 of the shank 45 of the clip 6A.

Figure 11:
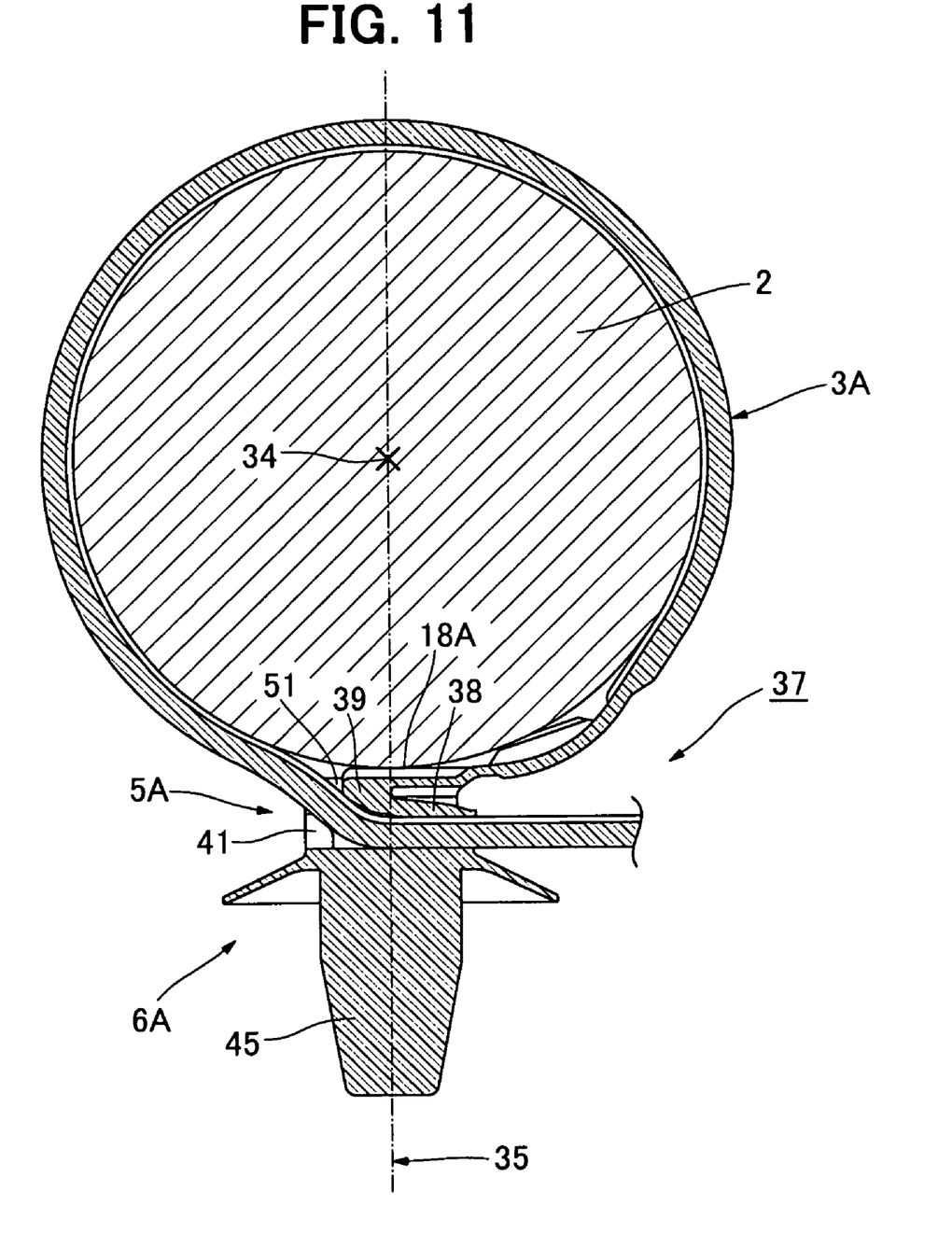
FIG. 11 is a cross-sectional view of a long component being held by the clamp in FIG. 7.

FIG. 11 shows a long component 2 with a round cross-section, such as electrical wiring or a wire harness, attached to the clamp 37. The band 3A is passed through the insertion passage 51 in the buckle 5A, and the ratchet teeth 42 on the band 3A are engaged by the pawl 38 to secure the band in a wound state. Because the band 3A is restrained inside the insertion passage 51, the long component 2 is held against the support surface 18A of the buckle 5A. After the band 3A has been inserted at the angle of inclination 29 in the front portion 55 of the insertion passage 51, it is pulled out substantially parallel to the pawl 38 in the rear portion 54. Because the band 3A is inserted at a certain angle of inclination 29 at the inlet, the long component 2 is held against the support surface 18A of the buckle 5A, so that the long component is kept from slipping into the inlet 53. This keeps the long component 2 from shifting its position on the buckle 5A irrespective of the outer diameter of the long component 2. By aligning the center line of a round cross-section long component, such as electrical wiring or a wire harness, with the center line of the support surface 18A of the buckle 5A and by aligning the center line of the clip 6 with the center line of the support surface 18A, the center line 34 of the long component 2 can be aligned with the axis 35 of the shank 45 on the clip 6A.

As explained earlier, because the position of a long component 2, such as electrical wiring or a wire harness, is kept from slipping in the buckle 5A regardless of the outer diameter of the long component 2, the long component 2 does not interfere with other components. Also, even if the clip 6A cannot be seen by a worker if a long component 2 has a large diameter, the center line of the long component 2 can be treated as the axis of the shank 45 on the clip 6A to easily mount the clip 6A in a mounting hole.

While preferred embodiments of the invention have been shown and described, changes can be made without departing from the principles and spirit of the invention, the scope of which is defined in the appended claims. In this regard, it should be noted that terms such as "top", "bottom", "upper", and "lower" that may be used in describing embodiments of the invention are not intended to limit the orientation of a clamp, which may be mounted in orientations other than that in which the axis of the mounting device is vertical.

What is claimed is:

1. A clamp for a long component, comprising:
a band constructed to be wound around a long component;
a buckle connected to a base of the band at one side of the buckle and having a support surface for placement thereon of the long component wound with the band; and
a mounting device extending from the buckle opposite to the long component on the support surface of the buckle for mounting the clamp on a support,
wherein the band has engagement portions formed at a certain interval along its length, and the buckle has a pawl for engaging the engagement portions to maintain the band in a wound state,
wherein the buckle has an insertion passage for guiding the band so engagement portions are engaged by the pawl, and has guide portions for restraining the band in the insertion passage,
wherein the insertion passage extends from an inlet for the band opposite to the base of the band to an outlet for the band near the base of the band such that a distance between the inlet of the insertion passage and the base of the band is greater than a distance between the outlet of the insertion passage and the base of the band, and
wherein the guide portions are shaped so that a rear portion of the insertion passage including the outlet is substantially parallel to the support surface, and so that a front portion of the insertion passage including the inlet is connected to the rear portion at an acute angle of inclination with respect to the rear portion; and
wherein the pawl is positioned in the insertion passage on a center line widthwise with respect to the insertion passage, wherein the guide portions include a first guide positioned on the center line of the front portion of the insertion passage widthwise with respect to the insertion passage and extending to the pawl, and a second guide with parts on side edges of the insertion passage and formed apart from the first guide heightwise so as to define the height of the insertion passage, and wherein the first guide and the second guide form the front portion of the insertion passage including the inlet.

2. The clamp described in claim 1, wherein the pawl and the first guide form an insertion passage surface apart from the support surface, and the second guide forms an insertion passage surface near the support surface.

3. The clamp described in claim 1, wherein the pawl and the first guide form an insertion passage surface near the support surface, and the second guide forms an insertion passage surface apart from the support surface.

4. The clamp described in claim 1, wherein the pawl forms a surface of the rear portion of the insertion passage, and wherein an engagement release tab is formed on an end of the pawl extending to the outside from the outlet.

5. The clamp described in claim 1, wherein the mounting device has a shank extending from the buckle and anchor legs bent back from the end of the shank towards the buckle for engaging a mounting hole, and wherein a boundary between the front portion and the rear portion of the insertion passage extends along an axis of the shank.

6. A clamp for a long component, comprising:
a band constructed to be wound around a long component;
a buckle having attached at one side thereof a base of the band and having a support surface for placement thereon of the long component wound with the band; and
a mounting device extending from the buckle opposite to the support surface of the buckle for mounting the clamp on a support,
wherein the mounting device has a longitudinal axis substantially perpendicular to the support surface,
where the buckle has an insertion passage with an inlet adjacent to the support surface near a side of the buckle apart from the base of the band and an outlet apart from the support surface at the side of the buckle to which the base of the band is attached, such that a distance between the inlet of the insertion passage and the base of the band is greater than a distance between the outlet of the insertion passage and the base of the band,
wherein the insertion passage has a front portion leading from the inlet to a rear portion leading to the outlet,
wherein the front portion extends at an acute angle of inclination with respect to the rear portion and the rear portion is substantially parallel to the support surface of the buckle, and
wherein the band and the buckle have cooperable elements for retaining a portion of the band in the insertion passage with the band wound about a long component on the support surface, inserted in the inlet of the insertion passage and extending from the outlet of the insertion passage.

7. The clamp described in claim 6, wherein the cooperable elements include a pawl in the insertion passage and a ratchet on the band.

8. The clamp described in claim 6, wherein surfaces of the insertion passage are provided by a first guide and a second guide defining a path through the insertion passage.

9. A clamp for a long component, comprising:
a band constructed to be wound around a long component;
a buckle having attached at one side thereof a base of the band and having a support surface for placement thereon of the long component wound with the band; and
a mounting device extending from the buckle opposite to the support surface of the buckle for mounting the clamp on a support,
wherein the mounting device has a longitudinal axis substantially perpendicular to the support surface,
where the buckle has an insertion passage with an inlet adjacent to the support surface near a side of the buckle apart from the base of the band and an outlet apart from the support surface at the side of the buckle to which the base of the band is attached,
wherein the insertion passage has a front portion leading from the inlet to a rear portion leading to the outlet,
wherein the front portion extends at an acute angle of inclination with respect to the rear portion and the rear portion is substantially parallel to the support surface of the buckle,
wherein the band and the buckle have cooperable elements for retaining a portion of the band in the insertion passage with the band wound about a long component on the support surface, inserted in the inlet of the insertion passage and extending from the outlet of the insertion passage,
wherein surfaces of the insertion passage are provided by a first guide and a second guide defining a path through the insertion passage;

wherein the first guide and the second guide define inclined surfaces of the front portion of the insertion passage, and the pawl extends from the first guide and defines a surface of the rear portion of the insertion passage substantially parallel to the support surface of the buckle, and wherein the second guide defines a surface of the rear portion of the insertion passage substantially parallel to the support surface.

10. The clamp described in claim 9, wherein the surfaces defined by the first guide and the pawl are farther from the support surface of the buckle than the surfaces defined by the second guide.

11. The clamp described in claim 9, wherein the surfaces defined by the first guide and the pawl are closer to the support surface of the buckle than the surfaces defined by the second guide.

12. The clamp described in claim 8, wherein the guides define bottom surfaces of the insertion passage and side edge and top surfaces of the insertion passage.

13. The clamp described in claim 12, wherein the top of the insertion passage is open between the side edge and top edge surfaces.

14. The clamp described in claim 6, wherein an axis of the mounting device substantially intersects a center line of a long component on the support surface and wound by the band.

15. The clamp described in claim 1, wherein a boundary between the front portion and the rear portion of the insertion passage is aligned with an axis of the mounting device.

16. The clamp described in claim 6, wherein a boundary between the front portion and the rear portion of the insertion passage is aligned with an axis of the mounting device.

17. The clamp described in claim 6, wherein a longitudinal axis of the mounting device runs through the insertion passage.

* * * * *